United States Patent [19]

Stem, Jr.

[11] Patent Number: 5,255,269
[45] Date of Patent: Oct. 19, 1993

[54] TRANSMISSION OF DATA BY FREQUENCY MODULATION USING GRAY CODE

[75] Inventor: Albert M. Stem, Jr., Tulsa, Okla.
[73] Assignee: Spacecom Systems, Inc., Tulsa, Okla.
[21] Appl. No.: 860,131
[22] Filed: Mar. 30, 1992
[51] Int. Cl.[5] .................. H04L 27/34; H03M 7/16
[52] U.S. Cl. .................................. 370/112; 370/118
[58] Field of Search .................. 370/112, 104.1, 97,
370/69.1, 121, 123, 19, 20, 21, 118, 95.3, 95.1,
110.1; 375/53, 85, 89

[56] References Cited

U.S. PATENT DOCUMENTS

| | | | |
|---|---|---|---|
| 2,036,165 | 6/1932 | Usselman | 250/17 |
| 2,294,209 | 11/1938 | Roder | 179/171.5 |
| 2,438,425 | 11/1942 | Vance | 250/36 |
| 3,032,717 | 6/1959 | Fowler et al. | 329/147 |
| 3,032,725 | 9/1959 | Knox-Seith | 333/20 |
| 3,162,729 | 11/1960 | Holt | 179/15 |
| 3,164,675 | 11/1961 | Buhrendorf | 178/66 |
| 3,213,367 | 2/1962 | Ravenscroft | 325/45 |
| 3,213,368 | 11/1961 | Geluk | 325/47 |
| 3,234,465 | 12/1962 | Lender | 325/42 |
| 3,263,185 | 2/1964 | Lender | 332/9 |
| 3,369,182 | 7/1964 | Reindl | 325/44 |
| 3,378,773 | 9/1965 | Jeffers | 325/139 |
| 3,502,987 | 6/1967 | Newton | 325/159 |
| 3,523,291 | 9/1967 | Peirret | 340/347 |
| 3,548,342 | 10/1968 | Maxey | 332/9 |
| 3,555,428 | 10/1966 | Perreault | 325/50 |
| 3,590,384 | 6/1971 | Van Gerwen | 325/141 |
| 3,603,976 | 9/1971 | Paine | 340/347 |
| 3,623,160 | 9/1969 | Glies et al. | 340/347 |
| 3,648,177 | 3/1972 | Mimmel | 325/141 |
| 3,735,034 | 5/1973 | Richeson, Jr. | 178/7.1 |
| 3,735,288 | 5/1973 | Strauss | 332/18 |
| 3,778,718 | 12/1973 | Bass et al. | 325/139 |
| 3,911,395 | 10/1975 | Koike | 340/146.1 |
| 3,921,072 | 11/1975 | Sato | 325/42 |
| 3,947,767 | 3/1976 | Koike et al. | 325/38 |
| 3,969,617 | 7/1976 | Fontanes | 325/152 |
| 3,973,201 | 8/1976 | Andren | 325/163 |
| 4,003,002 | 1/1977 | Snijders et al. | 332/10 |
| 4,010,421 | 3/1977 | Lind | 325/38 |
| 4,087,787 | 5/1978 | Acampora | 340/146 |
| 4,092,491 | 5/1978 | Frazer | 178/67 |
| 4,131,761 | 12/1978 | Giusto | 179/15 |
| 4,199,821 | 4/1980 | Munday | 375/60 |
| 4,387,366 | 6/1983 | Chow | 340/347 |
| 4,471,328 | 10/1984 | Chapman | 332/9 |
| 4,481,489 | 11/1984 | Kurby | 332/19 |
| 4,503,405 | 3/1985 | Jordan et al. | 332/18 |
| 4,521,749 | 6/1985 | Lockhart | 332/17 |
| 4,564,823 | 1/1986 | Stahler | 329/135 |
| 4,601,046 | 7/1986 | Halpern et al. | 375/38 |
| 4,622,670 | 11/1986 | Martin | 371/37 |
| 4,660,196 | 4/1987 | Gray et al. | 370/118 |
| 4,682,123 | 7/1987 | Loper et al. | 332/21 |
| 4,700,151 | 10/1987 | Nagata | 332/18 |
| 4,736,389 | 4/1988 | Debus, Jr. et al. | 375/59 |
| 4,761,798 | 8/1988 | Griswold, Jr. et al. | 375/59 |
| 4,804,931 | 2/1989 | Hulick | 332/31 |
| 4,841,571 | 1/1989 | Kage | 380/31 |
| 4,843,613 | 6/1989 | Crowle | 375/59 |
| 5,022,053 | 6/1991 | Chung et al. | 370/110.1 |

Primary Examiner—Wellington Chin
Attorney, Agent, or Firm—Head & Johnson

[57] ABSTRACT

A method of transmitting multiple synchronized multiplex data frames which, by individual selection and control of specific bit valves performance of individual subchannels may be altered including the steps of inputting data from a plurality of sources simultaneously into a plurality of multiplexers to provide as an output of each multiplexer composite data signals, synchronizing the composite data signals simultaneously received from the plurality of multiplexers in a multiplex controller, encoding the synchronized composite data signal into a Gray code format, applying the coded format data stream to a digital-to-analog converter, modulating a carrier signal with the analog signal output of the converter and transmitting the frequency modulated carrier signals by a transmission system.

2 Claims, 2 Drawing Sheets

TRANSMISSION OF DATA BY FREQUENCY MODULATION USING GRAY CODE

BACKGROUND OF THE INVENTION

This invention relates to a method of transmitting digital information by means of a frequency modulated carrier particularly useful for a satellite transmission system. The invention is particularly directed to a system for simultaneously transmitting by frequency modulated carrier a plurality of different digital signal sources simultaneously to thereby obtain maximum time economy for transmission of digital information.

Others have provided digital information transmission systems and for reference to the basic subject matter to which this disclosure pertains, see the following previously issued U.S. Pat. Nos. 2,036,165, 2,294,209, 2,438,425, 3,032,717, 3,032,725, 3,162,729, 3,164,675, 3,213,367, 3,213,368, 3,234,465, 3,263,185, 3,369,182, 3,378,510, 3,502,987, 3,523,291, 3,548,342, 3,590,384, 3,555,428, 3,603,976, 3,623,160, 3,648,177, 3,735,034, 3,735,288, 3,776,718, 3,696,617, 3,911,395, 3,921,072, 3,947,767, 3,973,201, 4,003,002, 4,010,421, 4,087,787, 4,092,491, 4,199,821, 4,131,761, 4,387,366, 4,471,328, 4,503,405, 4,521,749, 4,564,823, 4,601,046, 4,622,670, 4,761,798, 4,481,489, 4,682,123, 4,700,151, 4,736,389, 4,804,931, 4,841,571, 4,843,613.

While these prior art references have each advanced the state of the art relative to satellite transmission of digital information, nevertheless, the problem remains of time efficiently simultaneously transmitting a plurality of different digital signal sources utilizing a single carrier frequency.

SUMMARY OF THE INVENTION

This invention relates to the transmission of data by frequency modulation using Gray code. Gray coded digital transmission of multiple synchronized multiplexed data frames by frequency modulation allows for individual performance customizing of the transmission performance for the pre-multiplexed independent data stream inputs to meet individual user requirements.

A data frame is formed by time-division multiplexing a number of slower speed subchannel data streams together. These subchannels are assigned specific time locations in the data frame. The individual bits forming the frame occur at a rate equal to the slowest data rate available.

In the practice of this invention the number of bit locations assigned is proportional to the speed of the individual subchannels. For example, if the subchannel is to be 2.4 Kb/s, the subchannel is assigned 1 bit time in the data frame. If the speed of the subchannel is 9.6 Kb/s, the subchannel is assigned 4 equally spaced bit times in the data frame. Higher subchannel data rates are assigned a proportionally higher number of equally spaced bits in the data frame. A number of parallel time synchronized data frames are then multiplexed in this manner.

The multiple parallel data frames are synchronized together, not only with respect to data transitions, but also with respect to each numbered bit occurrence. For example, bit 13 of data frame #1 is in time synchronization with bit 13 of data frame #2, bit 13 of data frame #3, and bit 13 of data frame #4. The preferred method employs four data frames, but this number can vary depending on the overall system requirements. With four data frames, a waveform is produced with one of 16 voltage levels present at any bit time. The parallel bit streams are coded using the Gray code.

The Gray coded waveform is produced by applying the synchronized data frames in parallel to a digital-to-analog converter, the output of which is a multilevel amplitude representation of the four composite data frames. The example of four data frames will produce a waveform representation comprised of sixteen different amplitude levels. A carrier signal is then frequency modulated for transmission by conventional radio frequency means and is particularly adaptable for use with a satellite transmission system.

Reception and discrimination of the frequency modulated digital signal produces an analog voltage representative of that transmitted (which may be viewed as an "eye pattern") which is then sampled at specific times to determine the actual discriminated signal's relationship to a number of preset levels (either more positive or more negative). From the relationship to the preset levels, the digital information of a bit time on each of the data frames can be determined.

By individual selection and control of specific bit values, performance of individual subchannels can be altered. As one example of the many possibilities of the customizing of channel performance, consider performance selection of a single bit time in data frame #1. From the Gray scale it is apparent that if random data is sent on each data frame, the eye pattern for the data frame #1 decision size is subject to being 1/15th of the overall waveform amplitude.

Because of the Gray coding and synchronization of the data frames, the eye pattern opening (and hence the amount of deviation given any one bit) can be individually set per each bit time. This allows for a great flexibility in designing networks to meet individual requirements.

Using the Gray scale it can be seen that the eye pattern size for data frame #1 during a single bit time can be increased to 3 times the basic eye pattern size by forcing the corresponding data frame #4 bit to be a "1" during the time that bit is transmitted. This increases the performance of the bit time in data frame #1 at the expense of eliminating the use of the bit time in data frame #4. The flexibility of the method of this invention lies 1 that the performance of data frame #1 in another bit time is capable of being left at standard (an eye pattern size of 1/15th of the overall waveform amplitude) or being set to any other option without interfering with the example bit time.

As another example, from the Gray code it can be seen that by forcing the data frames #3 and #4 bit to "1", the eye pattern size for the bit time in data frame #1 will increase to at least 5 times the basic eye pattern size.

Many options exist for custom channel performance by setting bits to specific values at specific bit times. This allows the customizing of individual subchannels to the user requirements without requiring the system's minimum performance be set to the highest performance required on an individual subchannel. This allows for maximum overall throughput of data while meeting minimum performance objectives of each individual subchannel.

A better understanding of the invention will be obtained from the following description and claims, taken in conjunction with the attached drawing.

DESCRIPTION OF THE PREFERRED EMBODIMENT

Figure 1:
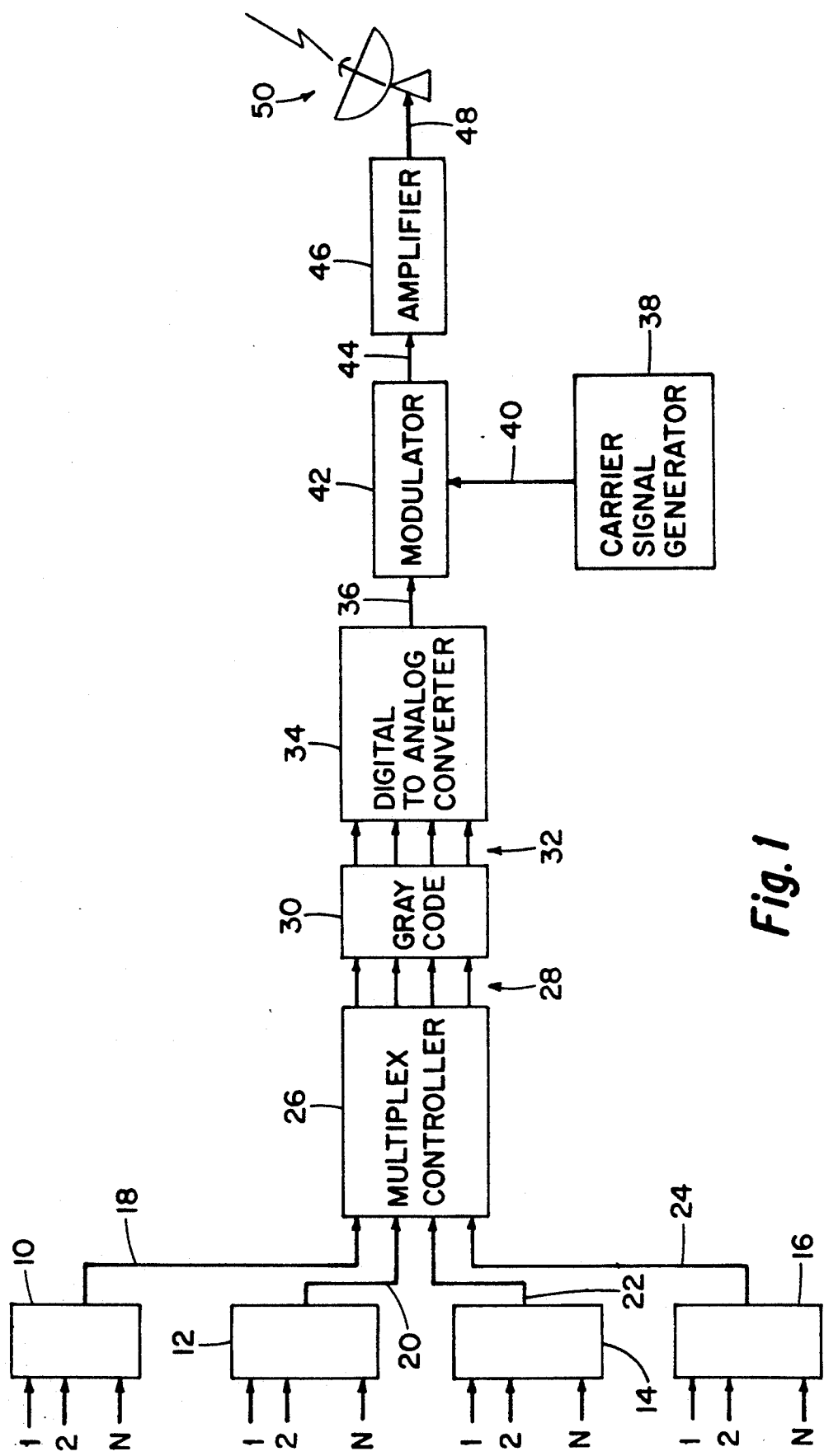
FIG. 1 is a block diagram showing the components required for practicing the method of this invention and particularly showing the components required for specifically utilizing a Gray code format having four data frames and wherein the method is employed for transmitting a plurality of digital data streams simultaneously on a frequency modulated carrier. The method of using the invention as illustrated in FIG. 1 is particularly applicable for satellite transmission, although it is understood that the invention is not limited to satellite transmission systems.

Referring to the drawings and first to FIG. 1, the basic components of a system for practicing the invention are illustrated, particularly for practicing the invention employing a Gray code format.

Four separate signal multiplexers are shown indicated by the numerals 10, 12, 14 and 16. Each of the multiplexers 10, 12, 14 and 16 has a plurality of inputs indicated by 1, 2 and "N" to thereby indicate a variable number of inputs into each of the multiplexers. Each of the multiplexers functions to time-division multiplex individual data streams. Multiplexer 10 provides at output 18 a data stream comprised of the plurality of input signals 1,2—N. In the same manner, multiplexers 12, 14 and 16 provide at outputs 20, 22 and 24 separate multiplex data streams, each of which represents a plurality of data signals.

The outputs 18, 20, 22 and 24 are fed to the input of a multiplex controller 26. The function of multiplex controller 26 is to synchronize the data frames from multiplexers 10, 12, 14, and 16. The output of the multiplex controller 26 appears on four conductors, generally indicated by the numeral 28, that carry the same signals as outputs 18, 20, 22 and 24 from the individual multiplexers, except on conductors 28 the data streams are time synchronized with each other.

The four data streams are fed by conductors 28 to a Gray code converter 30. In converter 30 the four data frames from conductors 28 are each converted to the Gray code as set forth in Table 1 as follows:

TABLE 1

| DATA FRAME #1 | DATA FRAME #2 | DATA FRAME #3 | DATA FRAME #4 | AMPLITUDE REPRESENTATION |
|---|---|---|---|---|
| 1 | 0 | 0 | 0 | 8 |
| 1 | 0 | 0 | 1 | 7 |
| 1 | 0 | 1 | 1 | 6 |
| 1 | 0 | 1 | 0 | 5 |
| 1 | 1 | 1 | 0 | 4 |
| 1 | 1 | 1 | 1 | 3 |
| 1 | 1 | 0 | 1 | 2 |
| 1 | 1 | 0 | 0 | 1 |
| 0 | 1 | 0 | 0 | −1 |
| 0 | 1 | 0 | 1 | −2 |
| 0 | 1 | 1 | 1 | −3 |
| 0 | 1 | 1 | 0 | −4 |
| 0 | 0 | 1 | 0 | −5 |
| 0 | 0 | 1 | 1 | −6 |
| 0 | 0 | 0 | 1 | −7 |
| 0 | 0 | 0 | 0 | −8 |

The Gray code representing four data frames provides for each location in the data frame at either a one or a zero and thereby provides 16 possible combinations which are represented, in Table 1, by amplitude representations for reasons to be explained subsequently.

The output from the Gray code converter 30 is fed by four conductors, indicated by numeral 32, to an input of a digital-to-analog converter 34. The function of the digital-to-analog converter is to convert the four data frames of the Gray code format into a single analog signal appearing at conductor 36.

Thus, at conductor 36 an analog signal is provided that encompasses in an analog format, a Gray coded digital information stream multiplexed from a plurality of individual data signals.

A carrier signal generator 38 provides at conductor 40 an input to modulator 42 that provides, at the output 44, a frequency modulated carrier signal. After amplification and otherwise treatment of the frequency modulated carrier signal in amplifier 46, the FM modulated signal at output 48 is fed to a transmitter 50, generally indicated by an uplink-type parabolic transmitter as is customarily utilized in satellite transmission systems. It is understood that the transmitter 50 is by way of example only and the principle of this invention may be utilized for transmission systems other than by satellite.

Figure 3:
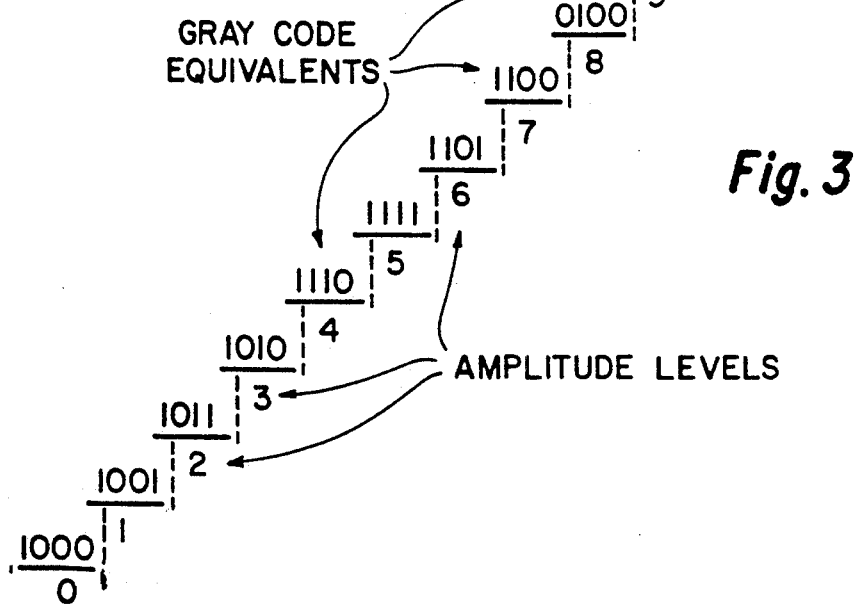
FIG. 3 illustrates amplitude levels wherein each bit (or symbol) can be at any one of 16 levels corresponding to one unique set (or group) of 4 bits (or symbols).

By use of the Gray code format the analog signal appearing at 36 is a continuous signal varying in 16 different voltage levels which are represented in FIG. 3 by amplitude extending from one to sixteen. This means that the analog signal at 36 can vary in a positive direction 8 levels and in a negative direction 8 levels, as indicated in Table 1. This may also be represented by 16 levels from 0-15 as illustrated in Table 2, wherein the data frames (channels) are represented as A, B, C, and D as originating, by example, from multiplexers 10, 12, 14, and 16 of FIG. 1.

TABLE 2

| Channel—— | A | B | C | D | |
|---|---|---|---|---|---|
| 15 | 0 | 0 | 0 | 0 | |
| — | — |   |   |   | ——————D |
| 14 | 0 | 0 | 0 | 1 | |
| — | — |   |   |   | ——————C |
| 13 | 0 | 0 | 1 | 1 | |
| — | — |   |   |   | ——————D |
| 12 | 0 | 0 | 1 | 0 | |
|   | B—————— |   |   |   | |
| 11 | 0 | 1 | 1 | 0 | |
| — | — |   |   |   | ——————D |
| 10 | 0 | 1 | 1 | 1 | |
| — | — |   |   |   | ——————C |
| 9 | 0 | 1 | 0 | 1 | |
| — | — |   |   |   | ——————D |
| 8 | 0 | 1 | 0 | 0 | |
| — | A—————— |   |   |   | |
| 7 | 1 | 1 | 0 | 0 | |
| — | — |   |   |   | ——————D |
| 6 | 1 | 1 | 0 | 1 | |
| — | — |   |   |   | ——————C |

TABLE 2-continued

| Channel | A | B | C | D |
|---|---|---|---|---|
| 5 | 1 | 1 | 1 | 1 |
| — — | | | | ------D |
| 4 | 1 | 1 | 1 | 0 |
| — | B | | | |
| 3 | 1 | 0 | 1 | 0 |
| — — | | | | ------D |
| 2 | 1 | 0 | 1 | 1 |
| — — | | | ------C | |
| 1 | 1 | 0 | 0 | 1 |
| — — | | | | ------D |
| 0 | 1 | 0 | 0 | 0 |

The amplitude level of the Gray code equivalency is illustrated in FIG. 3 showing amplitude levels from 0–15. This is equivalent as with respect to Table 1 of 0 voltage appearing between amplitude levels 7 and 8 providing, as previously indicated, 8 levels positive and 8 levels negative.

Figure 2:
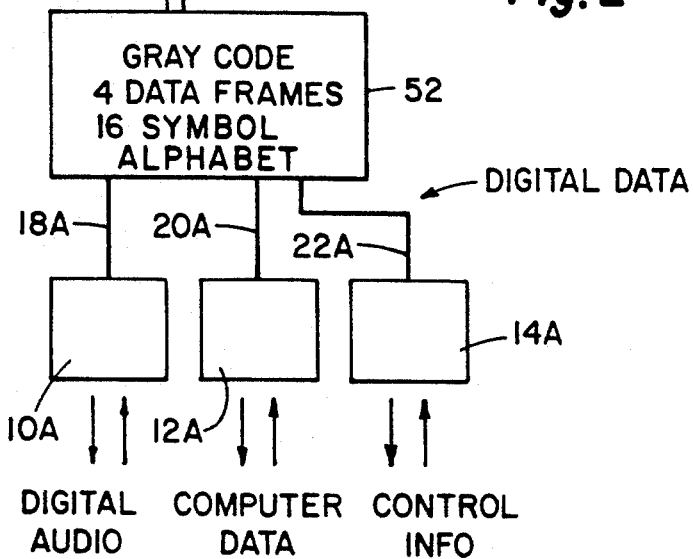
FIG. 2 is a rudimentary block diagram showing the use of the principles of this invention for the simultaneous transmission of digital audio, digital computer data and digital control data simultaneously using a single frequency modulated carrier.

FIG. 2 illustrates a typical application of the principles of this invention. The block 52, entitled "Gray Code 4 Data Frames 16 Symbol Alphabet" is made up of elements 26 through 46 of FIG. 1. In the example of FIG. 2, multiplexer 10A is used to input digital audio; multiplexer 12A is used to input digital computer data; and multiplexer 14A is used to input digital control information, for simultaneous transmission. Thousands of different digital signals can be simultaneously transmitted utilizing the principles of this invention.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A method of transmitting multiple synchronized multiplex data frames employing a transmission system having a selected carrier signal frequency, comprising the steps of:
   (a) inputting data from a plurality of data sources simultaneously into a plurality of multiplexers to provide as an output of each multiplexer a composite data signal to thereby provide a plurality of multiplexed output data signals;
   (b) synchronizing said output composite data signals simultaneously received from said plurality of multiplexers in a multiplex controller to provide a synchronized composite data signal stream output;
   (c) encoding the synchronized composite data signal stream output from step (b) into Gray code format to obtain a Gray coded data stream;
   (e) applying the Gray coded data stream from step (c) to a digital-to-analog converter to provide an analog signal output;
   (f) generating a carrier signal of frequency selected for the transmission system;
   (g) frequency modulating said carrier signal from step (f) with said analog signal from step (e);
   (h) amplifying said frequency modulated carrier signal from step (g); and
   (i) feeding the amplified frequency modulated carrier signal to the transmission system for transmission.

2. A method of transmitting multiple synchronized multiplex data frames according to claim 1 wherein said analog signal output of step (e) provides one of sixteen amplitude levels, each level corresponding to one unique group of four bits as employed in the Gray code encoding step.

* * * * *